(12) United States Patent
Partain et al.

(10) Patent No.: US 10,380,736 B1
(45) Date of Patent: Aug. 13, 2019

(54) MIP DETERMINATION OF SOLID CANCER SIZE AND SIZE CHANGES BASED ON CONTRAST ENHANCED MRI AND CT IMAGING

(71) Applicants: Larry Partain, Los Altos, CA (US); George Zentai, Mountain View, CA (US); Stavros Prionas, Menlo Park, CA (US); Raisa Pavlyuchkova, Mountain View, CA (US)

(72) Inventors: Larry Partain, Los Altos, CA (US); George Zentai, Mountain View, CA (US); Stavros Prionas, Menlo Park, CA (US); Raisa Pavlyuchkova, Mountain View, CA (US)

(73) Assignee: Larry Partain, Los Altos, CA (US)

( * ) Notice: Subject to any disclaimer, the term of this patent is extended or adjusted under 35 U.S.C. 154(b) by 58 days.

(21) Appl. No.: 15/290,951

(22) Filed: Oct. 11, 2016

Related U.S. Application Data

(60) Provisional application No. 62/241,538, filed on Oct. 14, 2015.

(51) Int. Cl.
*G06K 9/00* (2006.01)
*G06T 7/00* (2017.01)
*G06T 17/20* (2006.01)

(52) U.S. Cl.
CPC .......... *G06T 7/0012* (2013.01); *G06T 7/0081* (2013.01); *G06T 17/20* (2013.01); *G06T 2207/10081* (2013.01); *G06T 2207/10088* (2013.01)

(58) Field of Classification Search
CPC ...... G06T 7/0012; G06T 7/0081; G06T 17/20
See application file for complete search history.

(56) References Cited

U.S. PATENT DOCUMENTS 8,615,118 B2 * 12/2013 Yi .................. G06T 11/005
　　　　　　　　　　　　　　　　　　382/128
8,781,197 B2 *  7/2014 Wang .............. G01R 33/54
　　　　　　　　　　　　　　　　　　382/131

* cited by examiner

*Primary Examiner* — Nirav G Patel
(74) *Attorney, Agent, or Firm* — William Nuttle (57) ABSTRACT

Methods of obtaining a suspect nodules' sizes and/or growth rate are provided. In one embodiment, the method begins with at a first time: (i) obtaining a first three dimensional (3D) data set cube of voxels of a patient's anatomy including nodules; (ii) creating a second 3D data set cube of the same size as the first where all voxel values are set to zero; (iii) creating multiple Maximum-Intensity-Projection (MIP) images from the first 3D data set cube taken at different angles; (iv) replacing those voxels in the second 3D data set cube with corresponding voxels from the first 3D data set cube that provide non-zero values in the multiple MIP images; and (v) converting data in the second 3D data set cube into closed surface volumes, cross sectional areas or linear dimensions using image segmentation. Data from a second time can be used to determine growth rate.

11 Claims, 14 Drawing Sheets

RECIST

mRECIST

Choose A First θ1 Viewing Angle From The Original 3D CT Or MRI Data Set To Begin Constructing The Composite 3D MIP Image Data Set. Choose The Z Axis As The Axis Of Rotation Where The Plane Of The X And Y Directions Are Perpendicular To Z. Note That For Every Plane Defined By A Given Z Position Value, X Specifies A Given Column's Position In The Plane, Where The Voxel Values Then Vary In The Y Direction From Minimum To Maximum. For Each Such "x-column", Set All The Voxel Values To Free-space-values For All Voxels In That Column, Except For The Voxel With The Maximum Value In The Y Direction. Set This Single Remaining Voxel Value To Its Own Maximum Value. Then Repeat This Process For All Columns In This X-y Plane And For All Planes In The Volume To Provide The θ1 MIP Maximized Data Set.

1004

Choose A Second Viewing Angle θ2 That Is Rotated θ2 Degrees Around The Z Axis For This New Viewing Angle, Then Process The Original 3D CT Or MRI Image Data Set To Only Contain Non "free-space-voxel" Values In The Column Positions With "column-maximum" Voxel Values And "maximum" Values Only In The Column Positions Where They Occur.

1006

Using A Fixed 3D Coordinate System, Determine The Positions Of The Center Of Each Voxel In Both The First Iteration Composite 3D MIP Image Data Set And For Every Position Of The Center Of Each Voxel In The θ2 MIP Maximized Data Set. For Every Voxel In The θ1 Composite 3D MIP Data Set, Identify The Single Voxel Nearest It In The θ2 MIP Maximized Data Set. Then Take The Larger Of These Two Voxel Values As The Value For Each Of The Voxel Values In The Resulting Second Iteration, Composite 3D MIP Data Set.

1008

Choose A Third Viewing Angle θ3 Around The Z Axis And Repeat The Process Of The Secondfrom- Top Box Above To Provide The θ3 MIP Maximized Data Set. Next Repeat The Process Of The Third-from-top Box Above To Generate The Third Iteration Of The Composite 3D MIP Data Set. Repeat The Above For A Total Of N Times To Produce The Nth Iteration Of The Composite 3D MIP Data Set. Use The Latter Nth Iteration For The Segmentation Or Other Appropriate Analyses Processes.

MIP DETERMINATION OF SOLID CANCER SIZE AND SIZE CHANGES BASED ON CONTRAST ENHANCED MRI AND CT IMAGING

CROSS-REFERENCE TO RELATED APPLICATIONS

The present application claims the benefit of priority under 35 U.S.C. 119(e) to U.S. Provisional Patent Application Ser. No. 62/241,538, entitled MIP Determination of Solid Cancer Size and Size Changes Based On Contrast Enhanced MRI and CT Imaging," filed Oct. 14, 2015, which application is hereby incorporated by reference in its entirety.

TECHNICAL FIELD

The present invention relates generally to cancer detection, and more particularly to methods of detecting and determining solid cancer size and size changes of malignant cancer nodules based on contrast enhanced MRI and CT imaging.

BACKGROUND

Detection and treatment of cancer in early stages of tissue malignancy can lead to a favorable result if metastasis has not already occurred. In contrast, misdiagnosis and in particular false positive and over diagnosis, often lead to unnecessary further testing and/or treatment that can be costly and harmful, resulting in pain and mental anguish for the patient but often with little or no decrease in cancer mortality rates.

Figure 1A:
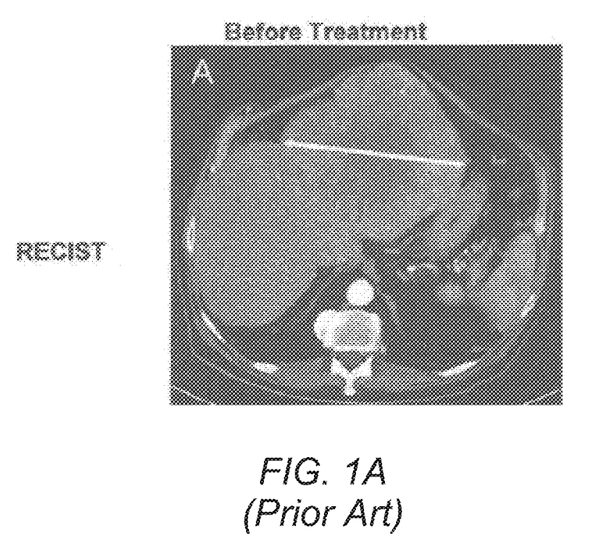
FIGS. 1A and 1B are before and after treatment contrast enhanced computed tomography (CT) images of a cancer nodule in a liver evaluated using a standard RECIST (Response Evaluation Criteria In Solid Tumors) technique.
Figure 1B:
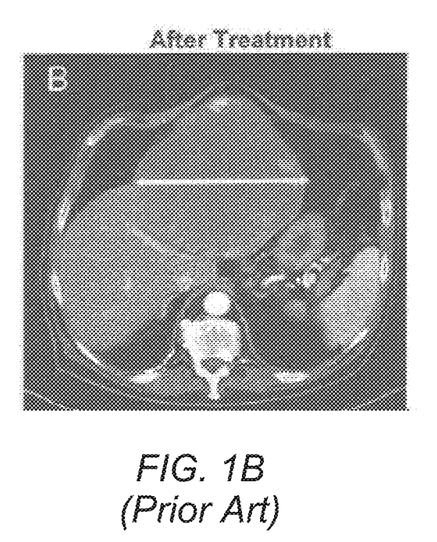
Figures 1C, 1D:
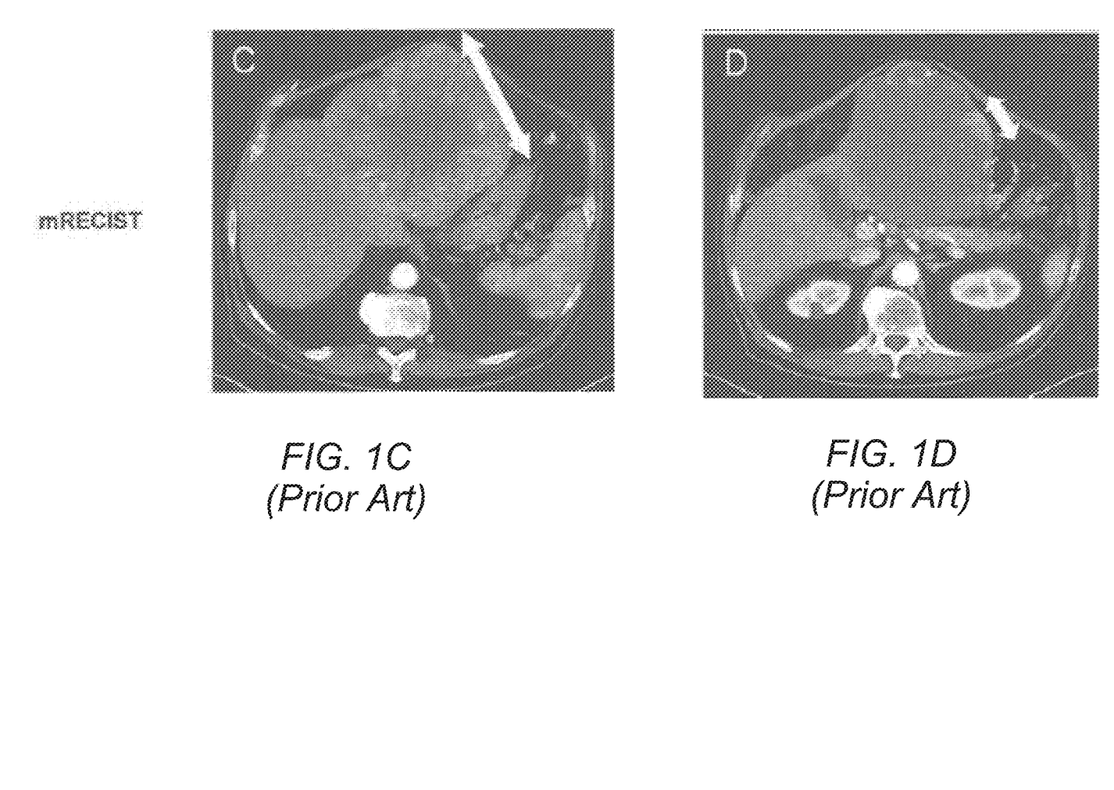
FIGS. 1C and 1D are before and after treatment contrast enhanced CT images of the cancer nodule of FIGS. 1A and 1B evaluated using a modified RECIST technique.
Figure 2:
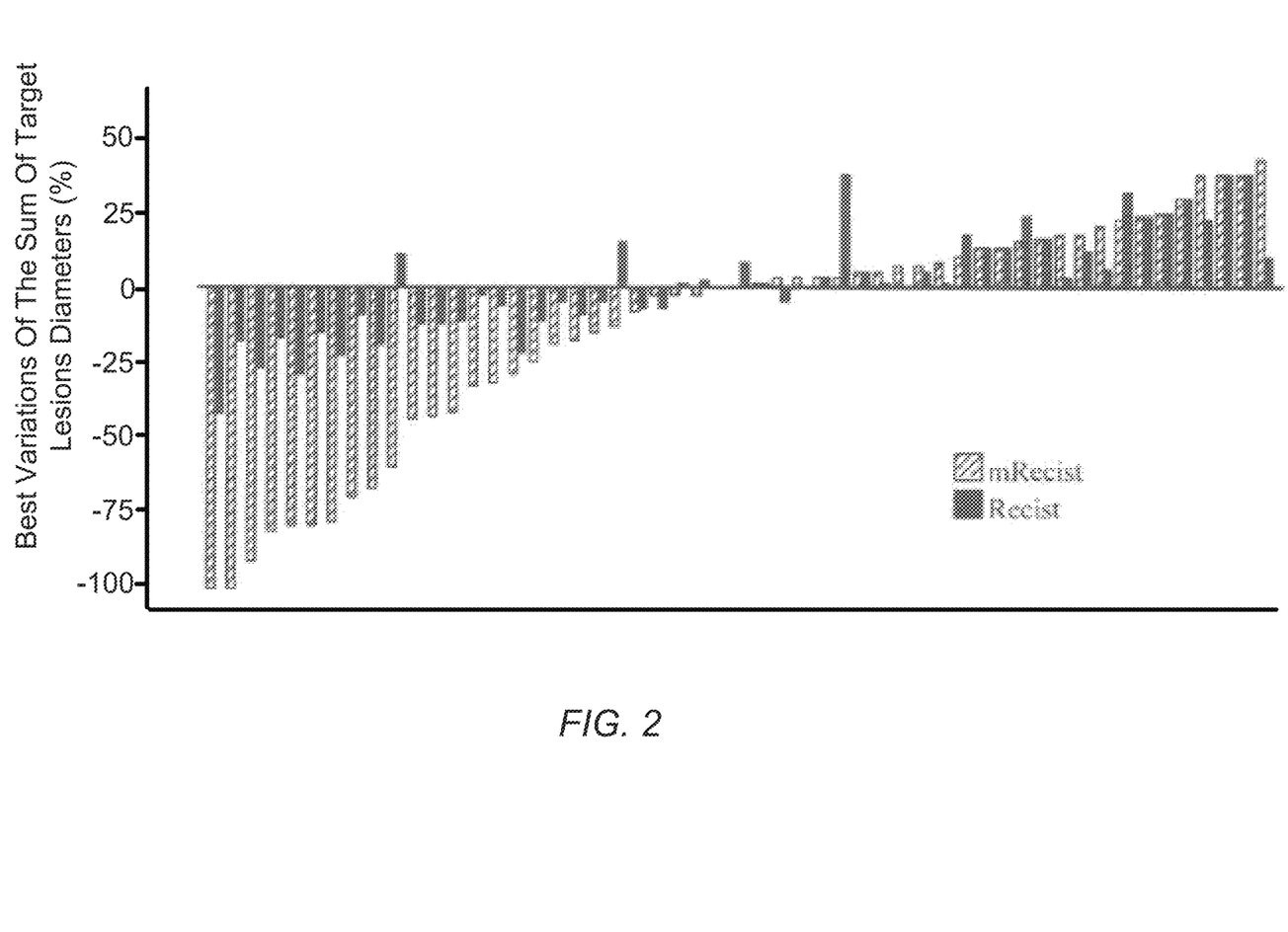
FIG. 2 is a waterfall plot of treatment response data for a number of live cancer patients evaluated using RECIST and modified RECIST techniques.

The conventional approach to determining cancer size (such as before and after treatment) and their change or growth rate are just linear measurements of a single maximum dimension as illustrated in FIGS. 1A through 1D for the approved and widely used and criticized Response Evaluation Criteria In Solid Tumors (RECIST) technique and a modified RECIST technique signified by mRECIST. FIGS. 1A and 1B are before and after treatment contrast enhanced computed tomography (CT) images of a cancer nodule in a liver evaluated using a standard RECIST technique. FIGS. 1C and 1D are before and after treatment contrast enhanced CT images of the cancer nodule of FIGS. 1A and 1B evaluated using a modified RECIST technique. The diverse results obtained with the RECIST and mRECIST techniques are shown in the plot of FIG. 2. FIG. 2 is a waterfall plot of treatment response data for a number of live cancer patients evaluated using RECIST and modified RECIST techniques. The major disadvantage of these approaches are that they underutilizes the advances from modern three dimensional (3D) CT and magnetic resonance imaging (MRI) due to the latter's current inabilities to reliably determine the transition boundaries where surfaces of malignant tissues switch to healthy normal ones.

Accordingly, there is a need for a method of detecting and determining solid cancer size and size changes utilizing contrast enhanced MRI and CT imaging that provides improved determination of transition boundaries and changes in cancer size.

SUMMARY

In a first aspect or embodiment, the method begins with at a first time: (i) obtaining a first three dimensional (3D) data set cube of voxels of a patient's anatomy including nodules; (ii) creating a second 3D data set cube of the same size as the first where all voxel values are set to zero; (iii) creating multiple Maximum-Intensity-Projection (MIP) images from the first 3D data set cube taken at different angles; (iv) replacing those voxels in the second 3D data set cube with corresponding voxels from the first 3D data set cube that provide non-zero values in the multiple MIP images; and (v) converting data in the second 3D data set cube into closed surface volumes, cross sectional areas or linear dimensions using image segmentation. Data from a second time can be used to determine growth rate.

BRIEF DESCRIPTION OF THE DRAWINGS

Embodiments of the present invention will be understood more fully from the detailed description that follows and from the accompanying drawings and the appended claims provided below, where:

FIG. 10 is a flowchart illustrating a method for determining solid cancer size and size changes of malignant cancer nodules according to another embodiment of the present disclosure.

DETAILED DESCRIPTION

Embodiments for methods of detecting and determining solid cancer size and size changes of malignant cancer nodules based on contrast enhanced magnetic resonance imaging (MRI) and computed tomography (CT) imaging are described herein with reference to the figures. However, particular embodiments may be practiced without one or more of these specific details, or in combination with other known methods, materials, and apparatuses. In the following description, numerous specific details are set forth to provide a thorough understanding of the present invention. In other instances, well-known imaging systems and techniques for detecting and determining solid cancer size and size changes have not been described in particular detail to avoid unnecessarily obscuring the present invention. Reference throughout this specification to "an embodiment" means that a particular feature, structure, material, or characteristic described in connection with the embodiment is included in at least one embodiment of the invention. Thus, the appearances of the phrase "in an embodiment" in various places throughout this specification are not necessarily referring to the same embodiment of the invention. Furthermore, the particular features, structures, materials, or characteristics may be combined in any suitable manner in one or more embodiments.

The present invention is directed to methods of determining the size of cancer lesions in patients and the change in these sizes based on analysis of three dimensional data sets of x-ray computed tomography (CT) or of magnetic resonance imaging (MRI) when a contrast agent has been injected into patient blood streams such as iodine for CT or Gadolinium (Gd) for MRI. Cancer lesions are distinguished by the very leaky blood vessels (angiogenesis) that invariably surround and penetrate them. For both CT and MRI, this makes the cancer lesions standout from the surrounding background tissues as the contrast agent leaks out. This helps define lesion surface boundaries in a consistent, reproducible and objective manner. Once a surface boundary is specified, it is then rather straightforward to automate the process of characterizing lesion size with quantitative metrics that include the volume of the enclosed lesion.

Figure 3:
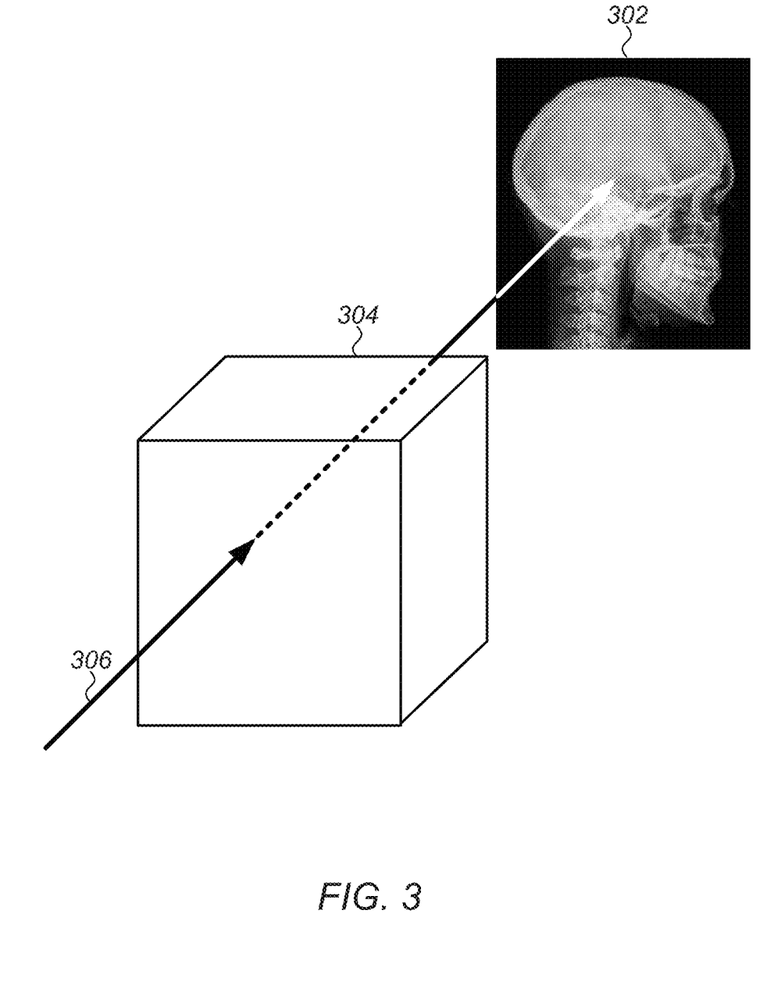
FIG. 3 is schematic diagram illustrating a digital reconstructed radiography (DRR) process for constructing DRR images from 3D CT image data sets according to an embodiment of the present disclosure.
Figure 4A:
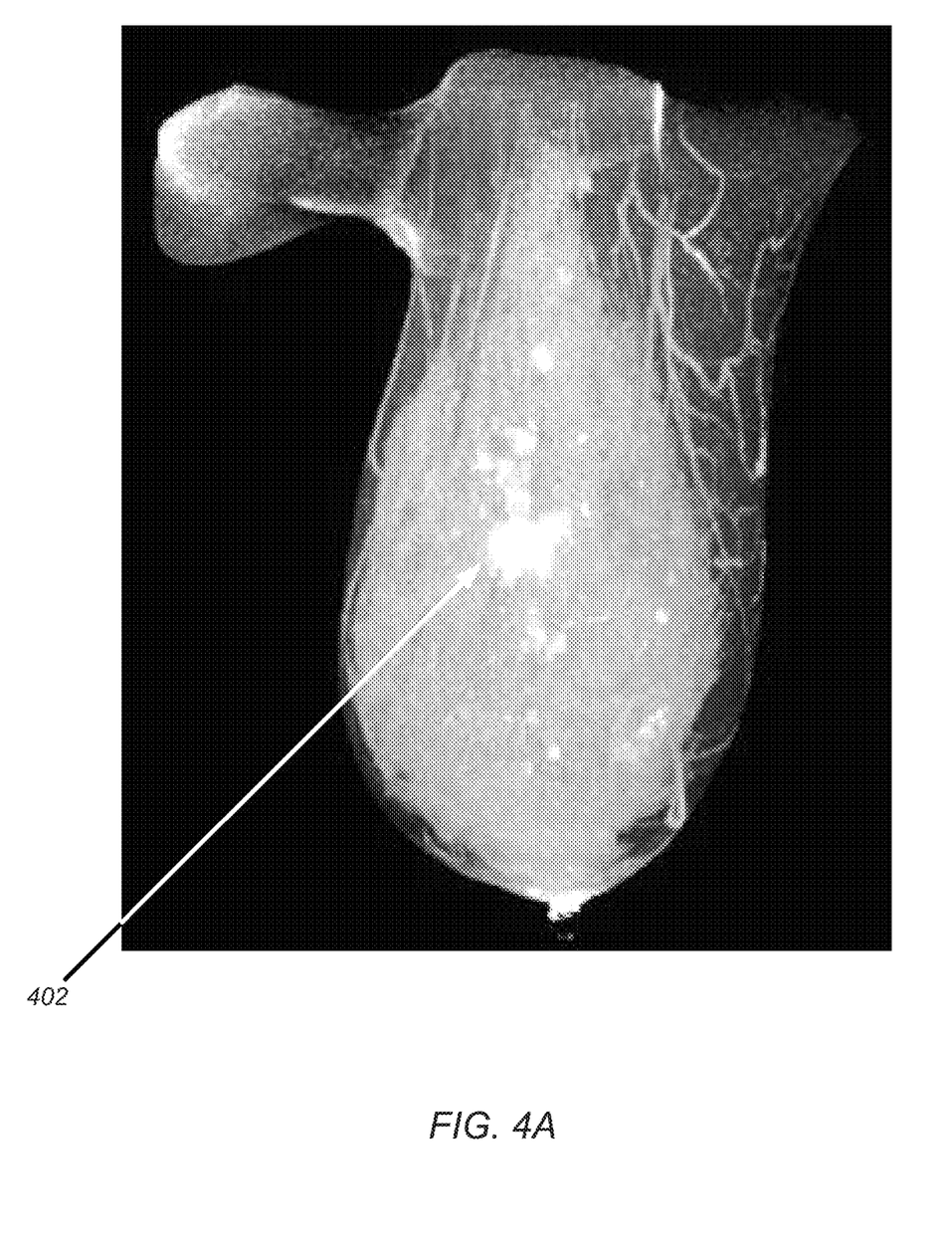
FIGS. 4A through 4C are Maximum Intensity Projection (MIP) images spaced about 60 degrees apart in vertical axis rotation from a mammography screened breast cancer processed using a 3D contrast enhanced cone beam CT data set processed according to an embodiment of the present disclosure.
Figure 4B:
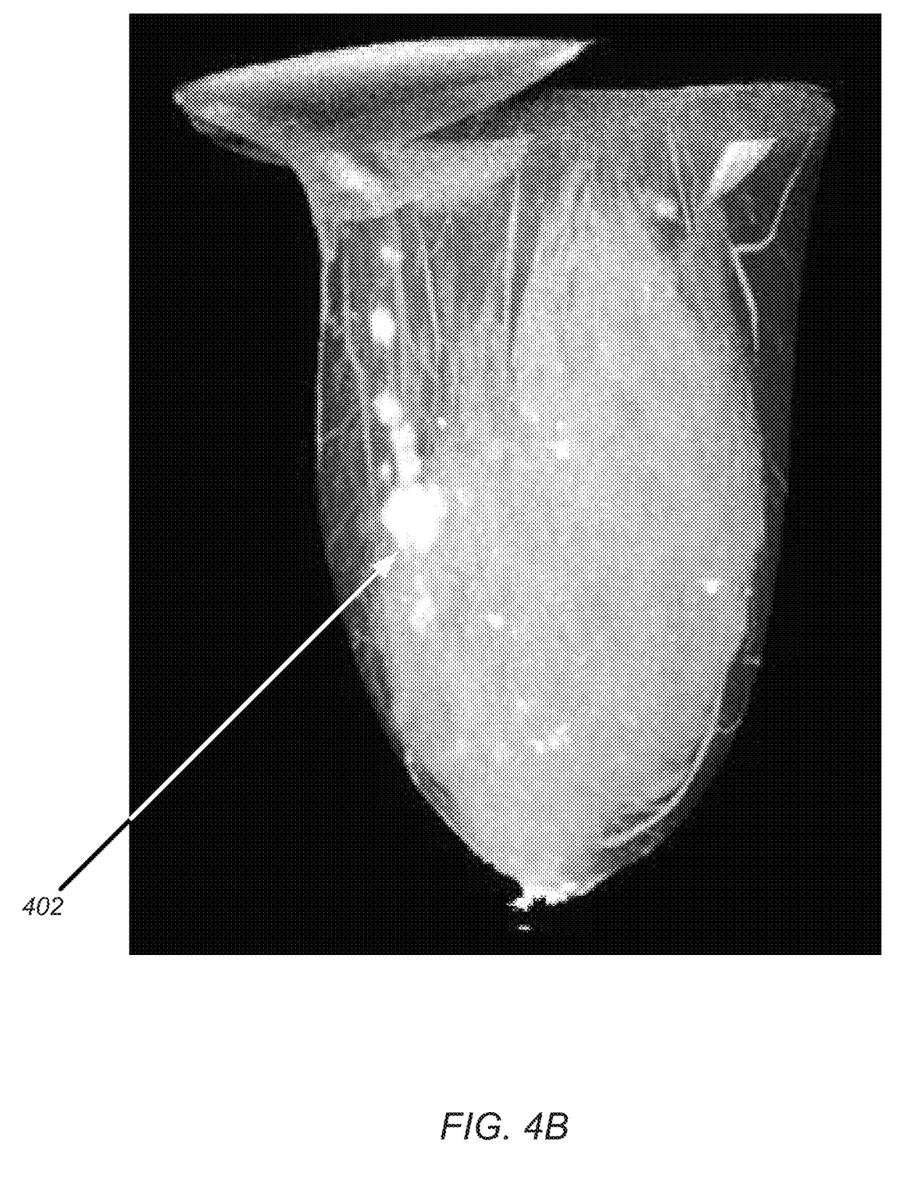
Figure 4C:
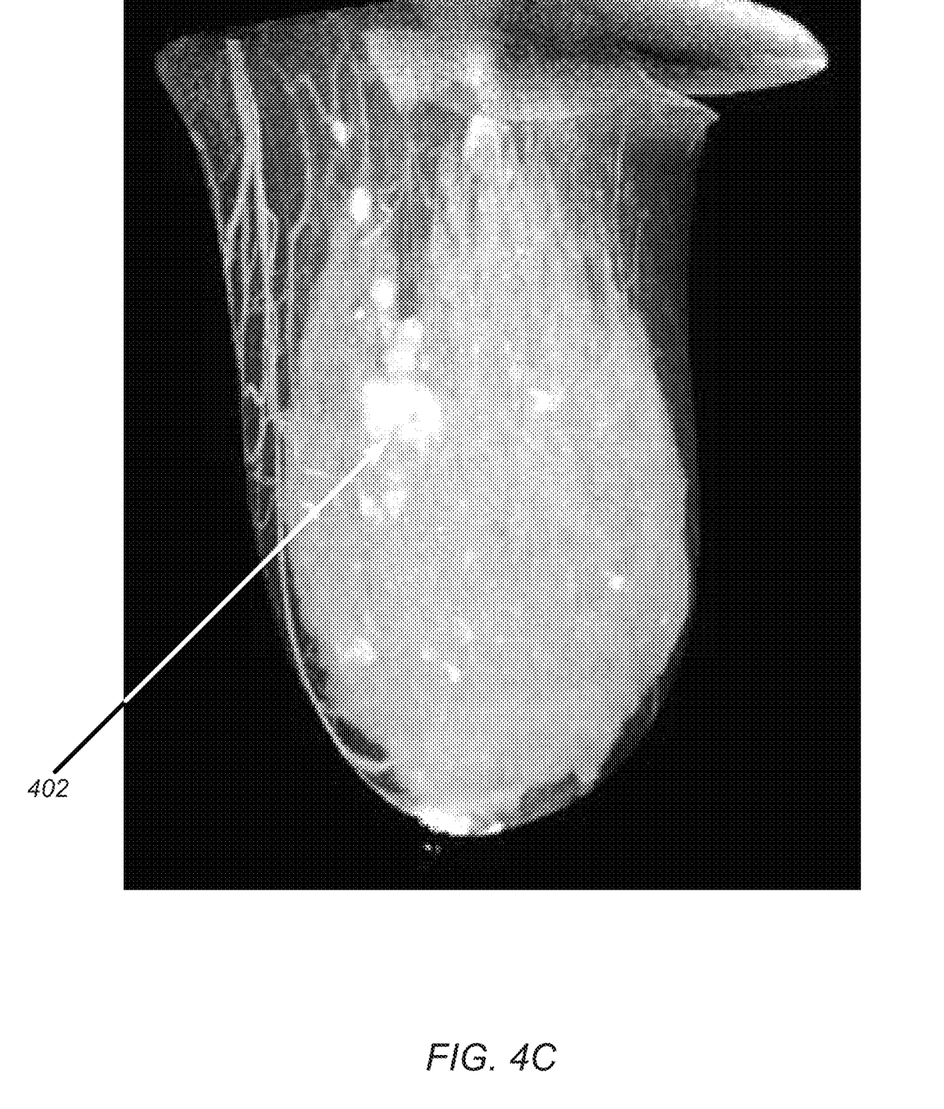

FIG. 3 is schematic diagram illustrating a digital reconstructed radiography (DRR) process for constructing DRR images 302 from three dimensional (3D) CT image data sets according to an embodiment of the present disclosure. In a first embodiment, FIG. 3 illustrates a three dimensional (3D) cube 304 of CT or MRI data with voxel data collections like 512×512×512 in 3 orthogonal directions. Each such 134 million ($=512^3$) voxels, are assigned a metric that represents the characteristic of the tissue that occupies that voxel space. For CT this is the tissue X-ray attenuation coefficient (or equivalent). For MRI it is typically a variable characteristic of the hydrogen atoms that occupy that voxel space in the patient. To construct a two dimensional 2D image, a projection arrow 306 is used to penetrate the cube 304 (see FIG. 3). As this arrow shifted over one face of the cube, pixels are produced that have a value that varies with each pixel's position. If one sums all the attenuation of all voxels along the projection arrow for x-ray CT data, the result is a simulated radiograph, called a digitally reconstructed radiography (DRR 302), as illustrated in FIG. 3. However if instead one takes only the maximum voxel value along a projection arrow, one obtains 2D maximum image projection (MIP) images as illustrated in FIGS. 4A through 4C for an actual breast cancer patient. FIGS. 4A through 4C are MIP images spaced about 60 degrees apart in vertical axis rotation from a mammography screened breast cancer processed using a 3D contrast enhanced cone beam CT data set.

This FIG. 4A illustrates at least ten (10) nodules 402 suspect of being malignant because of their iodine contrast enhanced x-ray CT MIP image. Because of surrounding glandular tissues (shown in grey scale) it can be difficult to determine an accurate boundary between malignant cancer tissue and the surrounding healthy tissues. This first embodiment, takes the FIG. 3 cube of x-ray attenuation coefficients and creates a new cube where all its (e.g. 134 million) voxels values are zero attenuation coefficient (or equivalent), except for those voxels that gave the MIP image, which now replace the "zero" voxel value in the new cube of voxels. The latter is a very sparsely filled cube using just a single MIP projection image direction. However this fills in as more MIP projection image directions are added, in such as those rotated 60 and 120 degrees away from FIG. 4A as shown in FIGS. 4B and 4C.

Figure 5:
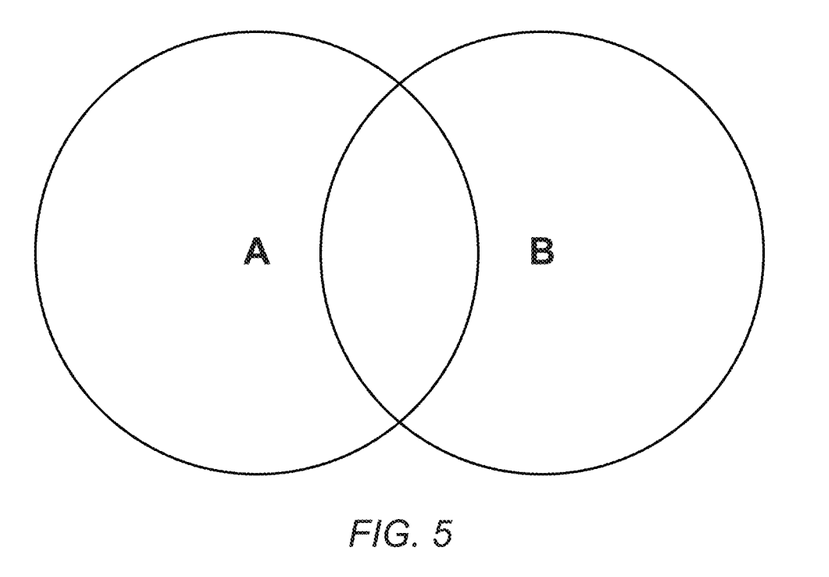
FIG. 5 is a schematic of spheres A and B whose volumes overlap that is used to define an overlap ratio to serve as a quantitative measure of the quality of a segmentation process compared to ground truth.

A criterion for when enough MIP values from enough view directions have been used is when the overlap ratio exceeds at least 0.7 but preferably an even higher value. FIG. 5 shows two spheres A and B that overlap where A is taken as the automated value volume estimation described here and B is taken as the ground truth volume. An illustration of the overlap ratio is two times the volume of the overlap region occupied by both spheres A and B, divided by the sum of the full volume of A, plus the full volume of B. A perfect match would be an overlap value of 1.0. By ground truth volume it is meant to be the volume determined by the most reliable technique available at any point in time. Currently the best "ground truth" volume is that determined by a well trained and experienced human observer (such as a MD radiologist) who hand contours the boundaries of every CT or MRI slice image that passes through a given suspect nodule. The latter is too time intensive, tedious and expensive for routine use in cases other than research studies, as particularly illustrated for cases like that shown in FIGS. 4A through 4C. However this "ground truth" technique is expected to evolve with time and eventually become an automated technique that does not require tedious human assistance through development techniques that include computer software machine learning processes. An example is the inclusion of specific number N of MIP projection images as taught by this patent and as validated with high overlap ratio values. Specifically the methods of detecting and determining solid cancer size and size changes of malignant cancer nodules of the present disclosure substantially eliminate the need for the human contouring "ground truth process."

It should be noted that x-ray attenuation coefficients are often expressed in Houndsfield Units (HU), where the attenuation coefficient for water is defined as HU=0 and the zero attenuation coefficient is defined as HU=−1000. For this case the second cube of voxels of this first embodiment is first filled with HU=−1000 values before some of them are subsequently replaced with higher HU MIP voxel values.

Figure 6A:
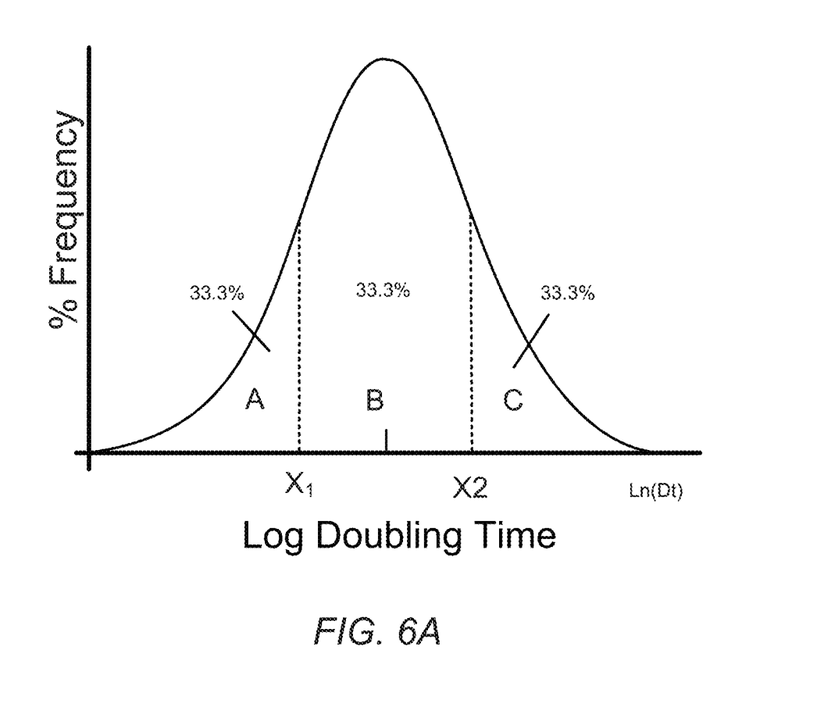
FIG. 6A is a schematic plot of clinical data of cancer growth rates observed clinically, which was divided into faster (A), intermediate (B), and slower (C) growth rates.
Figure 6B:
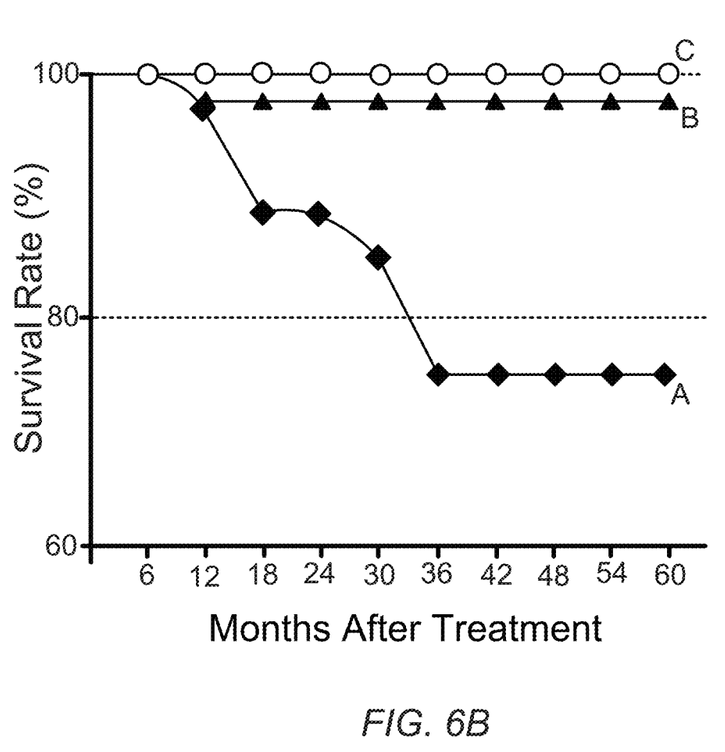
FIG. 6B is plot of the FIG. 6A study illustrating that lowest survival rates occurred with the patients who had cancers that grew the fastest.

A challenge for evaluating the MIP data like that shown in FIGS. 4A through 4C is that all the nodules visualized are either not malignant or grow so slowly that they would never become routinely clinical evident in the remainder of the patients' lives should the CT or MRI evaluation data never have been taken. Thus, these warrant no active medical intervention. Hence an important aspect of this first embodiment is the measurement of nodule size in two or more points in time so that relative and absolute growth rates can be estimated. It has been shown clinically that cancer mortality rates go up in patients whose cancer lesions grow the fastest as shown in FIGS. 6A and 6B. FIG. 6A shows the distribution of volume doubling times for diagnosed breast cancer lesions. FIG. 6B is plot of the FIG. 6A study illustrating that lowest survival rates occurred with the patients who had cancers that grew the fastest. FIG. 6A illustrates an example histogram of the frequency that a given tumor growth rate (TGR) (described by a log doubling time) from analysis of MRI screening for breast lesions, would have a given growth rate in exams of breast cancer patients taken overtime. By such as taking the logarithm of the TGR or equivalently a tumor volume doubling time (TVDT), a distribution such as a normal bell shaped one shown in FIG. 6A is found, where the fastest growing portion is identified as Group A, and the second and the third portions are identified as Group B and Group C, respectively.

FIG. 6B illustrates a relationship between cumulative survival rates and months after initial treatment taken from an x-ray mammography study, in accordance with one embodiment of the present disclosure. In one implementation, after a 36-month follow up, Group A with the fast growth rates have the lowest survival percentage (less than 80%) compared to over 95% survival percentages for Groups B and C. The X-ray mammogram study related to FIG. 7 also includes measuring the microvessel densities of the biopsied lesions of the selected population of patients, and the study finds that the highest densities correlate with the fastest growth rates. However, in one embodiment, biomarkers such as Gadolinium (Gd) contrast enhancement are used, because their values should monotonically increase with MVDs. This is important because biomarker values can be obtained by in vivo imaging without the need for biopsy. Because of the leaky nature of microvessels, the higher their density the higher the Gd contrast enhancement may be expected.

Figure 7:
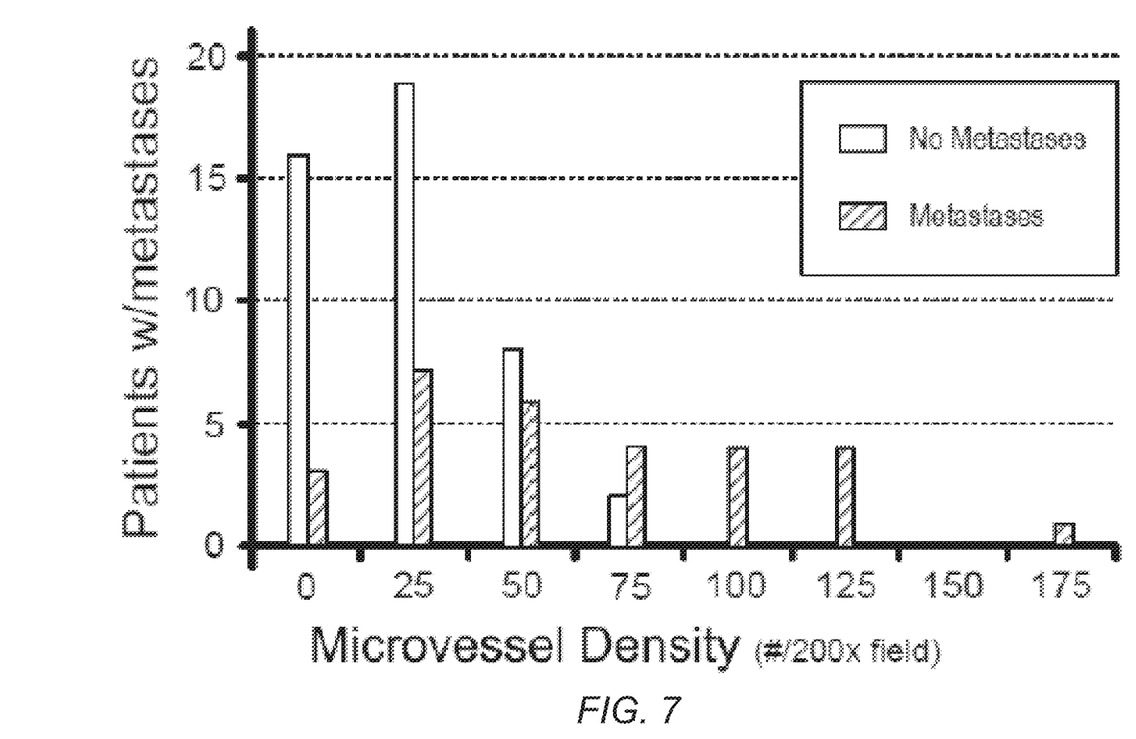
FIG. 7 is a plot to the number of patients in a study who did have and did not have cancer metastases as a function of microvessel density.

A very important aspect of cancer disease management is metastasis. It is not the primary tumor but its metastasis to distant sites that is the primary cause of death. FIG. 7 is a plot of a number of patients in a study who did have and did not have cancer metastases as a function of microvessel density. FIG. 7 shows that it is primary lesions with the highest microvessel density (i.e. the most angiogenesis), required for the fastest growth rates, which leads to the metastasis that accounts for most cancer deaths. Hence it is important to identify those cancer lesions that grow the fastest and produce metastases that cause most cancer death. Thus these fast growers warrant the more aggressive medical interventions and earliest treatments to lower mortality rates.

Figure 8A:
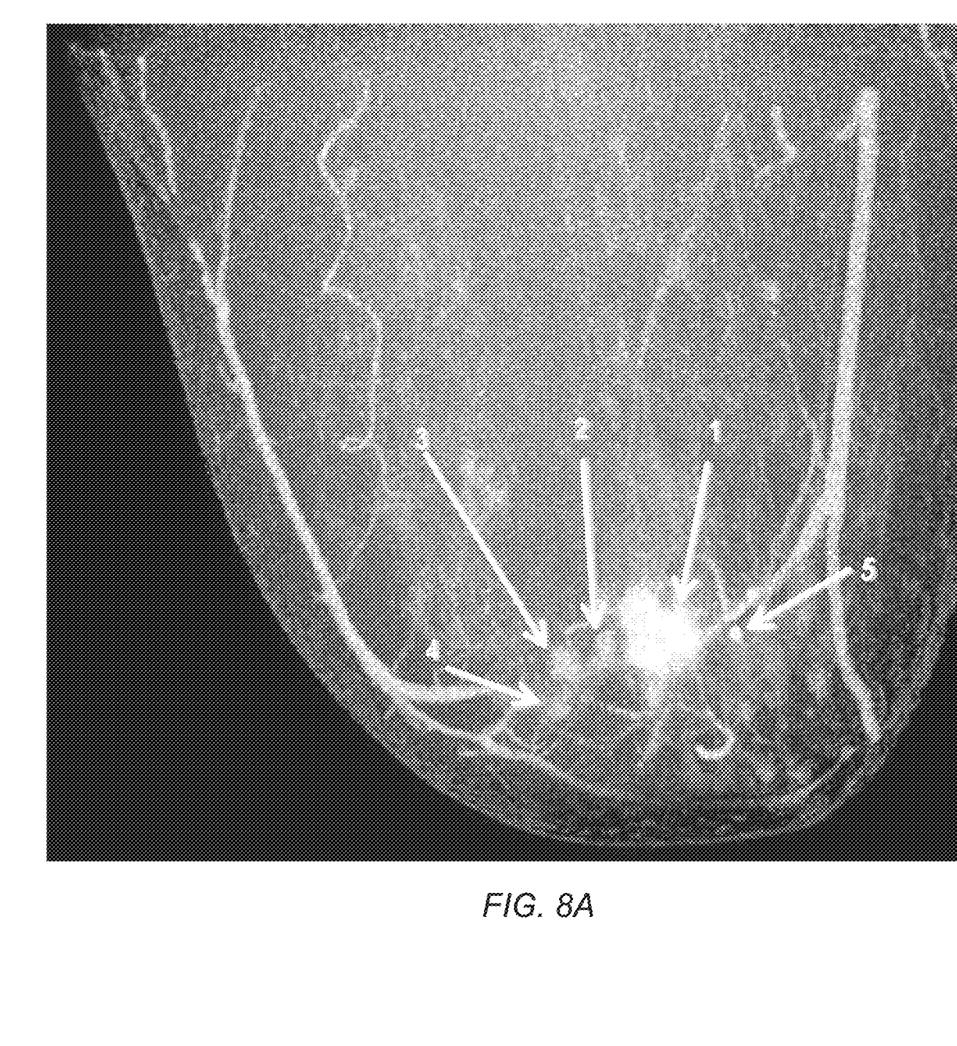
FIG. 8A is a MIP projection image from iodine contrast enhanced, 3D CT data set, of a breast cancer patient with 5 nodules suspected of being malignant.
Figure 8B:
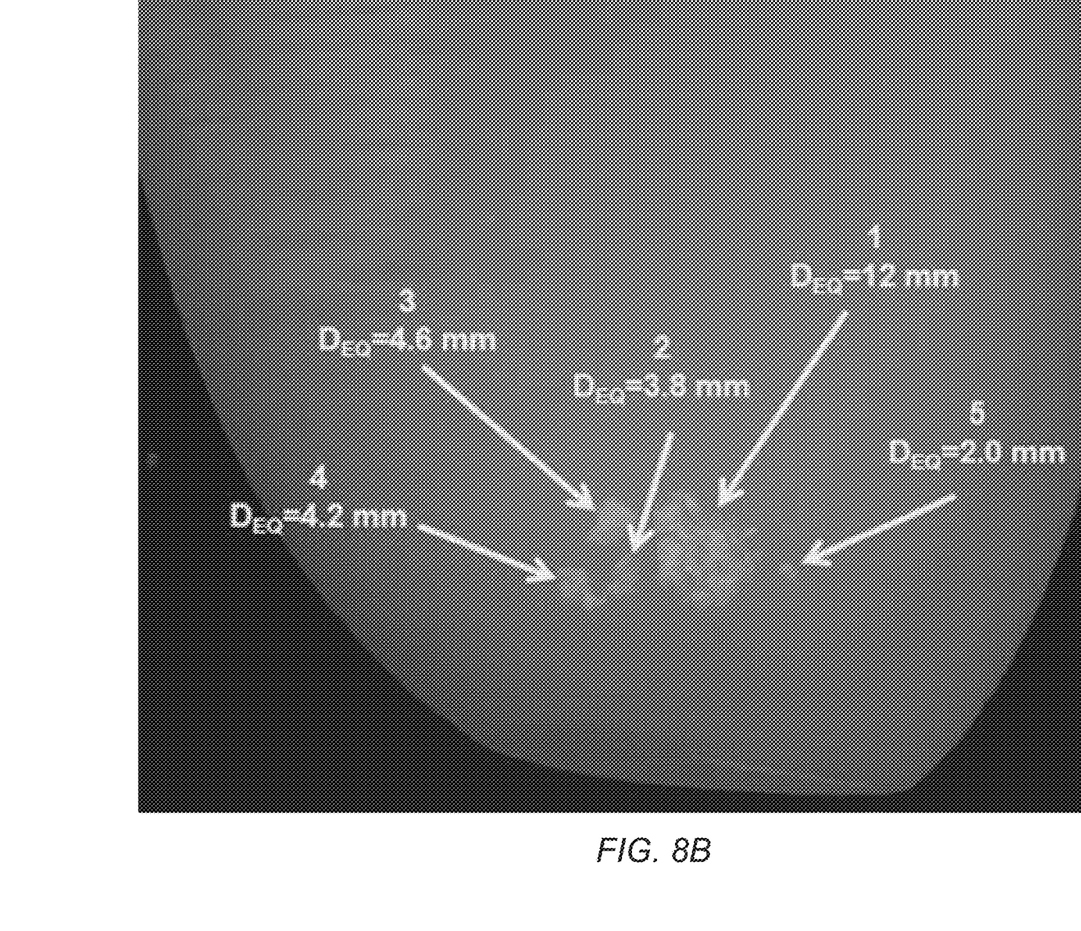
FIG. 8B illustrates a processed version of the image of FIG. 8A segmented using commercially available segmentation software.

Once a three dimensional (3D) CT or MRI data set has been properly processed as described in this embodiment, there are a variety of commercially available software packages to segment the data set of a suspect nodule and simultaneously calculate its volume enclosed by the segmentation. FIGS. 8A and 8B illustrates this outer surface determination and enclosed volume calculation for one breast CT data set that segmented or analyzed using Eclipse® treatment planning software, commercially available from Varian Medical Systems, Inc. of Palo Alto, Calif. FIG. 8A is the MIP radiograph of iodine contrast enhanced breast. FIG. 8B is the software segmentation of the same image segmented using Eclipse software and showing the five numbered suspect cancer lesions which also gives the volume enclosed by each of these segmentations. It is these volumes and their changes with time that are of the high prognostic value discussed immediately above.

However there an unlimited number of alternate quantitative "dimensions" that can be assigned to characterize each of these numbered nodules. One is the equivalent diameters ($D_{EQ}$) shown in FIG. 8B which are the diameters of the spheres with the same volume as that calculated by the "Eclipse" software. Linear dimensions are often used to roughly characterize cancer lesions. This clearly is more descriptive of Nodules 1, 3 and 5 of FIG. 8B and less so of the less spherical Nodules 2 and 4. Other quantitative characterization "dimension" alternates include averaged cross sectional areas (in say $cm^2$) taken in 3 orthogonal directions (nominally coronal, sagittal and axial) where each cross section is taken where it is maximum for the orthogonal viewing direction specified. The simplest and only widely and officially accepted and quantified "dimension" is the maximum linear dimension of a nodule, considering all viewing directions, as specified in the exact details of the RECIST size characterization method as illustrated in FIGS. 1A through 1D. It is the intent of this embodiment to improve on the latter in ways that can eventually be validated as more accurate and clinically useful in appropriate clinical trials.

The major problem here being solved is the difficulty of determining the surface edge cutoff positions of nodules that are particularly blurry when they are buried in surrounding tissues of similar CT or MRI values as discussed immediately above for the CT cases. By only retaining the voxel values of multiple contrast-enhanced MIP projection images (with all the other voxels remaining at "zero" values), most of the 3 dimensional CT or MRI "second" voxel cube is filled with these "zero-set voxels" (or equivalent). This then presents a much clearer 3D data set for robustly specifying boundary cut-offs (where a transition from "non-zero" to "zero" occurs) using readily available surface segmentation software from a number of vendors. This improved method and process is summarized in the flowchart of FIG. 9.

Figure 9:
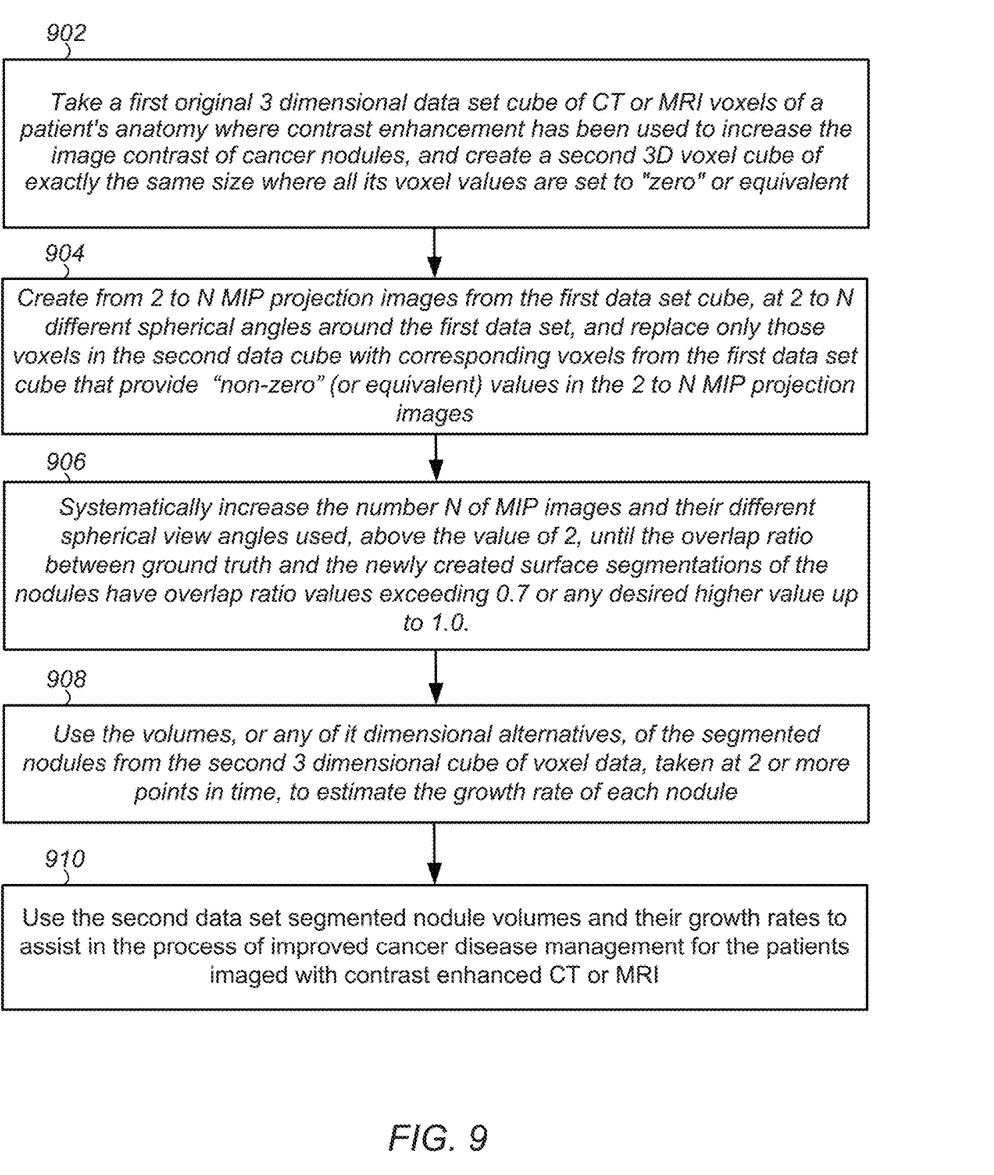
FIG. 9 is a flowchart illustrating a method for determining solid cancer size and size changes of malignant cancer nodules according to an embodiment of the present disclosure.

Referring FIG. 9, the method begins with taking an original or first 3D data set cube of CT or MRI voxels of a patient's anatomy, where contrast enhancement has been used prior to imaging to increase the image contrast of suspect cancer nodules, and creating a second 3D data set cube of exactly the same size where all its voxel values are set to "zero" or equivalent. (step 902) Next, from 2 to a number (N) MIP projection images are created from the first 3D data set cube, at 2 to N different spherical angles around the first 3D data set cube, replacing only those voxels in the second 3D data set cube with corresponding voxels from the first 3D data set cube that provide "non-zero" (or equivalent) values in the 2 to N MIP projection images. (step 904) The number N of MIP images and their different spherical view angles used, above the value of 2, are systematically increased until the overlap ratio between ground truth and a newly created surface segmentations (step 906) of the nodules have overlap ratio values exceeding 0.7 or any desired higher value up to 1.0. Next, the volumes, or any dimensional alternatives of the volumes, of the segmented nodules from the second 3D data set cube, taken at 2 or more points in time, are used to estimate the growth rate of each nodule. (step 908) As noted above, the volumes can be determined using any available surface segmentation software commercially available from a number of vendors of CT and MRI hardware systems. Finally, the second data set of segmented nodule volumes and their growth rates is used to assist in the process of improved cancer disease management for the patients imaged with contrast enhanced CT or MRI. (step 910)

Another θ-embodiment is summarized in the flowchart of FIG. 10. The process begins with choosing a single first viewing angle (θ1) from the original 3D CT or MRI cube data set to begin constructing the second composite 3D MIP-derived image data set cube. (step 1002) The z axis is chosen as the axis of rotation. The plane of the x and y directions are perpendicular to the z axis. For every plane defined by a given z position value, x specifies a given column's position in the plane, where the voxel values then vary in the y direction from minimum to maximum. For each such "x-column", set all the voxel values to "zero" free space values (or its equivalent which is −1000 HU for CT), for voxels in that column, except for the voxel with maximum value in the y direction. Set this single remaining voxel value to its own maximum value. Then repeat this process for all columns for all columns in the x-y plane and for all planes in the volume to provide the θ1 MIP-derived maximized data set cube. This result provides the first iteration of the composite θ-embodiment of the 3D MIP-derived image data set cube.

Next a second viewing angle θ2 is chosen that is rotated θ2 degrees around the z axis. (step 1004) For this new viewing angle, the second iteration is added to the composite θ-embodiment of the 3D MIP-derived image data set cube construction, to only add in the "zero" or equivalent into the column position with "column-maximum" voxel values or new "maximum" values on the column positions where they occur. The result is the θ2 MIP-derived image data set cube.

Using a fixed 3D coordinate system, determine the positions of the center of each voxel in the both the first and second iterations of the θ-embodiment of the 3D MIP-derived image data set cube. (step 1006) For every voxel in the first iteration, identify the single voxel nearest it in the second iteration. The take the larger of these two voxel values as the value for each the voxel values in the resulting second iteration. Repeat this process for a third viewing angle θ3 and then repeat this process of steps 1002 and 1004 for N total iterations, until some quality metric is met, that could be overlap ratio or any other appropriate metric, including a "best" determination according to one or more experienced and trained human observers. (step 1008) This θ-embodiment is just a special case of the first embodiment where all the spherical angles are chosen in a single plane and where quality metrics other than overlap ratios are considered.

A further embodiment is based on a binary presentation of the processed 3D MIP CT or MRI data. It still has all the voxel set to zero or equivalent values, but all these reset to non-zero values are replaced with a single "high" value such as 1000. For this latest embodiment the processed 3D data set consists only high and zero (or equivalent) voxel values. For particular sets of 3D CT and MRI data this expected to provide even more robust, reliable, and reproducible results that arise from the auto-segmentation of such "binary" data sets.

Concerning "ground truth" data sets to establish overlap ratios or even to provide routine diagnoses, there is a rapidly growing and very effective type of machine learning called "deep learning" that is becoming increasing accurate in computer recognition of both "pictures" (including medical CT and MRI images) and spoken language. These involve extensive labeled data sets, that a computer algorithm takes and teaches itself how to interpret the data sets to equal or even exceed the performance of trained and experience human observers or listeners. The computer, self-taught, deep learning process is based on convolutional neural network programs that have recently been expanded into multiple neural network layers. Their rapidly growing success records include self-driving cars from Google and speech recognition by "Siri" for Apple and "OK Google" for Android smart phones that perform with high accuracy in real time, typically based on Graphical Processing Units" (GPUs). The latter's ever accelerating progress depends in part on how long the "Moore's Law" process of computer power's exponential growth can continue.

An additional embodiment method uses a large number (up to a million or more i.e. big data) of hand segmented lesions suspected of being cancer (e.g. in the lungs) all generated by experienced and trained humans from 3D contrast enhanced CT or MRI data sets and then uses them for ground truths in the deep learning training process. Deep learning varies a large number of variables, that includes the number N of MIP projection images and their distribution over spherical 3 dimension space, as well as the large number of auto-segmentation variables (such as found in Eclipse® segmentation software) like the smoothness or roughness of the auto-segmentation surface. The result is a deep learning process (including the number N of MIP projection images and their spatial distribution) for assembling the 3D data sets from contrast enhanced CT or MRI imaging, that accurately gives overlap ratios that exceed 0.7 compared to ground truth, when used with available auto-segmentation software like Eclipse®. Here ground truth means the most accurate data set then available, which currently means those that are created by experienced and trained humans, but later can be those generated by some other validated "gold standard" process like machine learning that includes deep learning.

Thus, embodiments of methods of detecting and determining solid cancer size and size changes of malignant cancer nodules based on contrast enhanced MRI and CT imaging have been described. Although the present disclosure has been described with reference to specific exemplary embodiments, it will be evident that various modifications and changes may be made to these embodiments without departing from the broader spirit and scope of the disclosure. Accordingly, the specification and drawings are to be regarded in an illustrative rather than a restrictive sense.

The Abstract of the Disclosure is provided to comply with 37 C.F.R. § 1.72(b), requiring an abstract that will allow the reader to quickly ascertain the nature of one or more embodiments of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

Reference in the description to one embodiment or an embodiment means that a particular feature, structure, or characteristic described in connection with the embodiment is included in at least one embodiment of the circuit or method. The appearances of the phrase one embodiment in various places in the specification do not necessarily all refer to the same embodiment.

What is claimed is:

1. A method comprising:

at a first point in time:

obtaining a first three dimensional (3D) data set cube of voxels of a patient's anatomy including suspect nodules;

creating a second 3D data set cube of the same size of the first 3D data set cube where all voxel values are set to zero;

creating multiple Maximum-Intensity-Projection (MIP) images from the first 3D data set cube taken at different angles around the first 3D data set cube;

replacing only those voxels in the second 3D data set cube with corresponding voxels from the first 3D data set cube that provide non-zero values in the multiple MIP images providing clear boundary cut-offs of the suspect nodules; and converting data in the second 3D data set cube into closed surface volumes, cross sectional areas or linear dimensions using image segmentation to determine sizes of the suspect nodules and a potential that a given suspect nodule is a cancer nodule.

2. The method of claim 1 further comprising:

at a second point in time, repeating the obtaining the first 3D data set cube, creating a second 3D data set cube, creating multiple MIP images, replacing non-zero voxels in the second 3D data set cube, and converting data in the second 3D data set cube using image segmentation; and comparing the sizes of the suspect nodules obtained at the second point in time with the sizes obtained at the first point in time to determine a growth rate of the suspect nodules.

3. The method of claim 2 where the growth rate is considered to be a proportional metric for determining the potential that a given cancer nodule will metastasize.

4. The method of claim 1 wherein creating multiple MIP images comprises creating from 2 to a number (N) MIP images taken at from 2 to N different angles.

5. The method of claim 4 further comprising systematically increasing the number (N) of MIP images taken until the overlap ratio between a ground truth and the segmentations of the nodules have overlap ratio values exceeding 0.7.

6. The method of claim 1 wherein first 3D data set cube is obtained using contrast enhanced computed tomography (CT) imaging.

7. The method of claim 6 wherein iodine has been injected into the patient as a contrast agent prior to CT imaging.

8. The method of claim 1 wherein first 3D data set cube is obtained using contrast enhanced magnetic resonance imaging (MRI).

9. The method of claim 8 wherein Gadolinium (Gd) has been injected into the patient as a contrast agent prior to MRI imaging.

10. The method of claim 2 where the growth rate wherein the sizes of the suspect nodules obtained at three or more times are processed by averaging or fit to a curve to determine the growth rate of the suspect nodules.

11. The method of claim 1 wherein replacing the voxels in the second 3D data set cube comprises creation of a binary 3D data set where all the non-zero voxels value are set to a single and high value, and wherein whole data set is to binary with only zero or high voxel values to provide better auto-segmentation for some data sets.

* * * * *